United States Patent Office 3,116,343
Patented Dec. 31, 1963

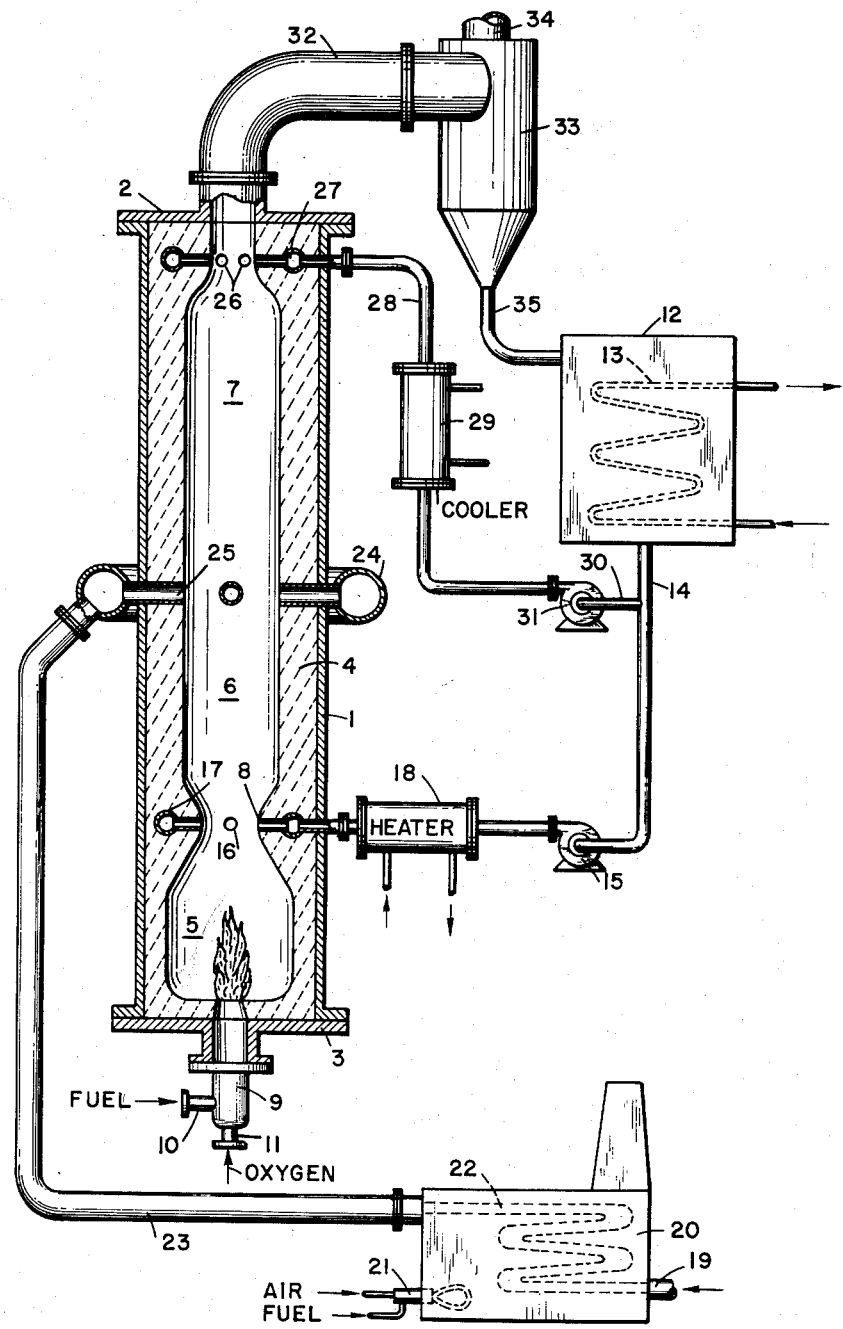

3,116,343
TEMPERATURE-STABILIZED CONVERSION OF HYDROCARBONS AND THE LIKE
Paul F. Deisler, Jr., Berkeley, Calif., assignor to Shell Oil Company, New York, N.Y., a corporation of Delaware
Filed Aug. 19, 1960, Ser. No. 50,801
10 Claims. (Cl. 260—679)

The invention relates to the imparting heat to reactants which undergo an endo-enthalpic reaction upon being heated and is particularly, but not exclusively, applicable to the production of unsaturated compounds by pyrolysis, such as dehydrogenation and dehalohydrogenation. It relates to an improvement in the processes wherein the reactants are heated to reaction temperature by mixing them with a stream of hot carrier gases, such as flame gases. The reaction is, in most cases, terminated by quenching.

While the invention can be applied to advantage in a variety of reactions, it is particularly useful in pyrolysis of saturated or unsaturated hydrocarbons to produce hydrocarbons having a higher carbon-to-hydrogen ratio. Such a process can use, as the starting material, any hydrocarbon capable of further dehydrogenation to an unsaturated compound, such as normally gaseous hydrocarbons (such as methane, ethane, ethylene, propylene, propane, butanes and butylene), hydrocarbons which are liquid at room temperature, such as pentanes, hexanes, heptanes and their olefins, and petroleum distillates and residuals. The invention finds particular application in the production of ethylene, acetylene, and charging streams for subsequent formation of aromatics, such as benzene. The lower saturated hydrocarbons, viz., particularly methane, ethane and propane, are the most commonly used initial reactants. The invention is also useful, for example, in the pyrolysis of halogenated hydrocarbons, such as dichloroethane to form vinyl chloride by splitting off of HCl, or carbon tetrachloride to form fluoroethanes.

Because of the endothermic nature of such reactions large quantities of thermal energy at a high temperature level are required. For example, in the production of ethylene or acetylene from methane, ethane or propane the dehydrogenation occurs at temperatures which start at between 1000° and 2000° C. and diminish as the reaction proceeds, to permit the reactions to be completed in very short times, often between $10^{-1}$ and $10^{-4}$ second. When lower temperatures are used the reactions proceed too slowly; either they do not occur to any significant extent in a long time or undesirable side reactions take place. For example, the reactants may be largely pyrolyzed to carbon and hydrogen without or with reduced formation of the desired unsaturated hydrocarbons. To prevent prolonged exposure to such lower pyrolysis temperatures the reactants must be heated rapidly and quenched promptly after the desired reaction is completed.

Because of limitations of known equipment, it is not feasible to heat such reactants with enough speed by indirect heat exchange, such as tubular heaters and pebble heaters, and other techniques must be employed. One expedient is to add the charge of reactants to the hot flame gases resulting from the burning of hydrogen-containing fuel, such as hydrogen or a hydrocarbon, with oxygen, which is supplied as air, oxygen-enriched air or substantially pure oxygen, the last of these being often preferred to attain high temperatures and to avoid the dilution effect of nitrogen, which is detrimental, for example, to the production of acetylene.

The temperature significantly influences both the reaction rate and the relative yields of the products. For example, ethane reacting at about 1000° C. yields ethylene as a principal product, whereas at about 1300° C. or higher it yields larger amounts of acetylene. The temperature which prevails within the reaction zone is, however, far from constant and falls progressively as the endothermic reaction proceeds. It would be desirable to reduce this temperature gradient, to exercise better control over equilbrium conditions.

A further difficulty in known techniques is the occurrence of oxygenated dissociation products in the flame gases at the high temperatures prevailing when admixed with the hydrocarbon charge. For example, at 2127° C. and atmospheric pressure, 4% of the $H_2O$ vapor in the flame gases produced by burning stoichiometric proportions of hydrogen and oxygen are dissociated and occur as $O_2$, O and OH. At 2850° C., which is the temperature of any oxyhydrogen flame, the dissociation is about 21%. Because in prior processes, the hot flame gases must be at elevated temperature (often between the temperatures mentioned) to bring the hydrocarbon charge quickly to a temperature sufficiently above the average pyrolysis temperature to permit endothermic dehydrogenation, large amounts of these oxygenated dissociation products were introduced into the charge.

It was found that although higher yields of unsaturated hydrocarbons, such as olefins, acetylene and benzene, can be predicted from equilibrium data as the pyrolysis temperature is increased, they were not realized and undesired by-products are produced despite quenching which limits the reaction time to periods of the order of $10^{-4}$ to $10^{-1}$ seconds. Experiments with such reactions, in which preheated hydrocarbon charges were simply mixed with the hot flame products from an oxyhydrogen flame, have now suggested that the primary source of the failure to attain such increased yields is the presence of these oxygenated dissociation products, which are present whenever hydrogen-containing fuel is burned with atomic oxygen.

The presence of such dissociation products in the flame gases is known and is mentioned, for example, in U.S. Patent No. 2,912,475 to Krause et al., wherein suppression of dissociation by steam dilution is suggested as a remedy. Steam dilution, however, leads to a reduction in reaction temperature and to low thermal efficiency.

It is an object of this invention to provide an improved method and apparatus for carrying out endothermic, vapor-phase reactions, such as the pyrolysis of hydrocarbons or halogenated hydrocarbons to produce unsaturated hydrocarbons or halogen-containing unsaturates having a higher atomic carbon-to-hydrogen ratio by admixture to hot flame gases to bring the charge to pyrolysis temperature wherein the temperature is stabilized without incurring the thermal inefficiency inherent in steam dilution. More particularly, it is an object to reduce the temperature of the initial mixture of hot flame gases and reactants in relation to the final temperature thereof (prior to quenching when, as is usual, quenching is employed), without any significant loss of recoverable energy from the hot flame gases.

A further object is to maximize the yield of dehydrogenated hydrocarbons which result when a hydrocarbon charge is mixed with hot flame gases produced by burning hydrogen-containing fuel with oxygen and to minimize the production of oxygen-containing by-products. Specific objects are to reduce the presence of such oxygenated dissociation products in the flame gases at the instant at which the hydrocarbon charge is commingled therewith without reducing the average reaction temperature; and to increase the yield of unsaturated hydrocarbons wherein the atomic carbon-to-hydrogen ratio is unity.

In summary, according to the invention in its broad aspect a temperature-stabilizing substance having a vaporizing temperature within the range of useful reaction temperatures is injected into the hot flame gases and vaporized therein to reduce the flame-gas temperature prior to admixture of the charge containing the reactant, the mixture is passed through a reaction zone wherein endothermic reaction occurs, and the said substance is condensed (at least in part) within the reaction zone, thereby releasing latent heat of vaporization and supplying heat to the endothermic reaction and reducing the fall in temperature within the reacting mixture.

In a more specific aspect the invention comprises increasing the yield of unsaturated hydrocarbons, particularly ethylene and hydrocarbons wherein the atomic ratio of carbon-to-hydrogen is unity, by lowering the temperature of the hot flame gases produced by burning hydrogen-containing fuel with oxygen by the injection of the said temperature-stabilizing substance to a level wherein the oxygenated dissociation occur in reduced amounts, usually less than 2% and, preferably, less than 1% of the water vapor content, and maintaining the temperature of the reacting mixture in the reaction zone by condensation of the said substance therein.

Usually the reacting mixture is quenched at or just beyond the downstream end of the reaction zone, as by injecting a liquid coolant into the mixture, and the flow velocity of the reactants through the said zone is controlled to attain the desired reaction time, whereby undesired reactions are suppressed. However, quenching is not an indispensible step of the process and may be omitted when the final products, resulting from prolonged reaction, are desired or at least do not adversely affect the yield of the desired products. According to an optional feature the quench liquid may be the same as the temperature-stabilizing substance, although usually at a lower temperature; by this feature only one material needs to be separated from the effluent gases and the separation thereof from the gases is facilitated.

The said temperature-stabilizing substance is most conveniently injected as a liquid spray; introduction as a solid, e.g., as a powder entrained in a heated carrier gas, if possible. It is advantageous to inject it at elevated temperature, below its boiling point, to avoid removing large amounts of heat from the flame gases, it being desired to effect the cooling of the flame gases mainly by vaporizing the said substance; however, such preheating is not essential and adoption of this step will be governed mainly by economic considerations.

In most applications the temperature-stabilizing substance should have a vaporizing temperature which is between about 1000° and 2000° C. under the pressure conditions which prevail within the reaction zone, it being understood that not all such vaporizing temperatures are best suited to every reaction, and that the temperature-stabilizing substance should be chosen as is described below having regard to the desired temperature level. The vaporizing temperatures will be influenced by the pressure prevailing within the reaction zone and will, in general, be lower than the boiling points of the said substances at the same pressure due to the fact that the partial pressures thereof in the reaction zone are less than the total pressure. The said substance should be stable at the vaporizing temperature and substantially inert chemically toward the hydrocarbons in the reaction zone.

Particularly suitable for use as the temperature-stabilizing substance are the alkali metal halides and alkaline earth metal halides, and metal oxides. Examples of such halides are barium fluoride, calcium chloride, cesium bromide, lithium bromide, lithium chloride, lithium fluoride, lithium iodide, magnesium bromide, magnesium chloride, potassium chloride, potassium fluoride, potassium iodide, and sodium chloride. Other substances, such as antimony trioxide, barium oxide, bismuth trioxide, cadmium fluoride, and silver chloride can be used.

On adding the non-gaseous temperature-stabilizing substance to the hot flame products, which usually occur at a temperature above 2100° C., e.g., 2100° to 2900° C., said substance is vaporized and the resultant mixture of flame products and vapor assumes a temperature below the initial flame temperature. Further, in the special case wherein the reduced temperature is brought to below 1850° C. the dissociation of water is reduced and when practicable in view of the nature of the reaction such dissociation can be further suppressed by lowering the temperature still farther, e.g., to below 1750–1800° C. This temperature reduction is brought about without removing recoverable energy from the flame gas or with but a small removal of recoverable energy because a portion of the thermal energy of the flame is converted into stored, latent heat of vaporization. When the reactant is subsequently added to this mixture, the endothermic reaction abstracts energy from the flame product-vapor mixture and the vapor is condensed, yielding up the stored latent heat as sensible heat to provide the heat of reaction at a desired temperature level determined by the vapor pressure-temperature characteristics of the condensing substance. Thus, the choice of the temperature-stabilizing substance on the basis of its boiling point is a significant feature of this invention.

It is often useful to employ oxyhydrogen flames, having temperatures above 2500° C. to insure that the cooled flame gases have a high energy content.

The amount and boiling point of the stabilizing substance which is added to the hot flame products for vaporization therein are selected in accordance with the effect desired. In those cases in which only avoidance of the temperature extremes in the reacting mixture is desired, even small amounts can be used to advantage. However, when suppression of undesired oxygen-containing hydrocarbon derivatives is the purpose, the amount should be sufficient to reduce the temperature of the flame gases to the level at which dissociation of water is brought to an acceptable level. Because higher temperatures cause more rapid and more complete conversions, and often lead to more favorable equilibrium conditions, it is desirable not to reduce the temperature more than necessary to limit the dissociation of water vapor. Hence, a compromise must be made in most instances.

In accordance with this invention when suppression of such undesired oxygen-containing hydrocarbon derivatives is a purpose, the temperature is reduced to that at which water is dissociated to less than about 2% and, preferably, to less than 1%, although the invention is not restricted to these specific values. Because the degree of dissociation is influenced also by pressure and the hydrogen content (i.e., as determined by the ratio of fuel to oxygen used in the combustion) no unique temperature limits correspond to the limits of this dissociation range. For a stoichiometric hydrogen-oxygen flame the dissociation of $H_2O$ in the flame products at atmospheric pressure is about 2% at 1980° C. and about 1% at 1780° C. Pressure influences the dissociation, which is about 2% at 1880° C. for one-half atmospheres absolute, and at 2050° C., for two atmospheres absolute. When the flame contains an excess of hydrogen the total amount of oxygen occurring as $O_2$, O and OH at a given temperature decreases.

Based upon the foregoing considerations, it is desirable, when suppression of oxygenated dissociation products is an object, to reduce the temperature of the hot flame gases to below 1900 to 2000° C., and, preferably, to below 1700 to 1825° C., the lower temperature in each instance being applicable to reduced pressures and the higher temperatures to superatmospheric pressures. Usually, the temperature-stabilizing substance should, in such cases, have a vaporizing temperature between 1300° and 1850° C., and particular substances will be selected having regard to the relationships given above. The temperature of the resultant flame gas-vapor mixture is not necessarily brought down to the vaporizing temperature of the injected substance, although it is usually desirable to add it in sufficient amount so that the said resultant temperature is not more than 300° C. above the said vaporizing temperature. Of course, the amount injected is normally not greater than that required to lower the flame gases to said vaporizing temperature, inasmuch as there would be no benefit in having the flame gases contain entrained, unvaporized liquid.

The invention will be further described with reference to the accompanying drawing forming a part of this specification, the single view of which shows, in vertical section, a reactor for carrying out the process, auxiliary equipment being shown diagrammatically and not to scale.

Referring to the drawing in detail, the reactor comprises a cylindrical metal shell 1 having end closures 2 and 3 and containing a refractory lining 4 which defines an elongated passageway defining, successively, a combustion zone or chamber 5, a vaporization zone 6 and a reaction zone 7. The combustion chamber is preferably separated from the vaporization zone by a throat 8, which forms an inlet to the latter zone for the entry of hot flame gases from the combustion chamber. A hydrogen-containing fuel, such as hydrogen, methane, or another hydrocarbon and an oxidant, such as air, oxygen-enriched air or oxygen, are admitted to the combustion chamber through a burner 9 from supply pipes 10 and 11, respectively.

A temperature-stabilizing substance, such as lithium fluoride is maintained in a storage tank 12 in the liquid state by a heating coil 13 and is supplied via a pipe 14 and pump 15 to the flame gases through one or more injection pipes 16, connected to a circular header 17. Optionally the stream of stabilizing liquid is passed through a heater 18 to bring the temperature close to but below its vaporizing temperature. The pipes 16 are preferably arranged in the throat 8 to insure distribution in the hot flame gases immediately upon emergence from the combustion chamber. The injected liquid is vaporized as the flame gases flow through the vaporizing zone 6, thereby absorbing latent heat and reducing the temperature of the flame gases.

The reactant, such as hydrocarbons to be pyrolyzed, is supplied via a pipe 19 and preferably preheated in the furnace 20 having a burner 21 and containing coils 22 through which the charge flows. The heated charge flows as a gas through a pipe 23 to a circular header 24 and thence is introduced into the mixture of flame gases and vapor through radial pipes 25 which are situated at the upstream end of the reaction zone 7. The charge is thereby brought to reaction temperature and the reaction occurs endothermically as the resultant mixture flows through the reaction zone. The temperature falls during this reaction; however, the temperature-stabilizing substance condenses and yields its latent heat of vaporization, thereby reducing the extent to which the temperature falls. The reactant mixture may and will in most instances be quenched upon emerging from the reaction zone. Quenching can be effected in various ways, e.g., by injecting a liquid through a plurality of quench pipes 26 from a circular header 27, to which it is supplied via a pipe 28. In some cases it is desirable to cool this liquid, as by flow through a cooler 29, to insure that the reacting mixture is cooled to a temperature at which the reaction substantially ceases.

According to an optional feature of the invention the quench liquid is the same as the temperature-stabilizing substance. This is especially suitable when the substance is liquid below 600° C. To this end a part of the liquid from the pipe 14 is drawn off via a branch pipe 30 and supplied via a pump 31 to the cooler 29. Use of the same material for the quench liquid simplifies the separation of the reaction products from the added streams, in that only one material need be recovered; it further facilitates condensation of all of the temperature-stabilizing substances.

The quenched stream flows through a pipe 32 to a suitable separator, such as a cyclone 33 from which the gaseous constituents are discharged via a gas pipe 34 and the temperature-stabilizing liquid is returned to the tank 12 via a pipe 35.

*Example*

(A) To the hot combustion gases having a temperature of 2740° C., obtained by burning, per hour, 1000 normal cubic feet (measured at 0° C. at one atmosphere of pressure) of hydrogen and 500 normal cubic feet of oxygen, 32.5 lbs. per hour of lithium fluoride, preheated to 850° C., is injected as a spray, this amount being such that the resultant temperature of the gases and the lithium fluoride vapor is 1725° C. To this mixture 450 normal cubic feet per hour of ethane, preheated to 600° C. is added, producing a mixture having an initial temperature of 1650° C. The mixture is passed through a reaction zone and quenched after 0.003 second. Within the reaction zone endothermic dehydrogenation occurs, causing a temperature fall to 1200° C. and condensation of most of the lithium fluoride vapor. Liquid lithium chloride at a temperature of 850° C. is used as the quench liquid.

(B) The same amounts of hydrogen, oxygen and ethane are reacted as indicated sub A, using the same initial flame and ethane preheat temperature, with the difference that no temperature-stabilizing substance is injected and water is used as the quench liquid. In this case the initial temperature of the mixture of flame products and ethane is about 2220° C. and the final temperature of the reacted mixture 1275° C.

The analysis of the gaseous reactor effluents (on a dry, LiF-free basis) are as given in the table:

|  | Percent Mol. (dry basis) | |
|---|---|---|
|  | A<br>With lithium fluoride | B<br>Without lithium fluoride |
| $CO_2$ | 00.3 | 02.9 |
| $C_2H_2$ | 28.1 | 12.6 |
| $C_2H_4$ | 03.3 | 01.8 |
| $CO$ | 01.3 | 11.7 |
| $H_2$ | 57.4 | 62.0 |
| $CH_4$ | 09.2 | 08.8 |
| $C_2H_6$ | 00.4 | 00.2 |

I claim as my invention:

1. In the process for carrying out endothermic reactions at elevated temperature by feeding at least one reactant into a stream of hot flame gases produced by burning hydrogen-containing fuel with oxygen to raise the temperature of said reactant to reaction temperature and flowing the resultant mixture through a reaction zone wherein an endothermic reaction occurs, the improvement which comprises:
   a. lowering the temperature of said flame gases and stabilizing that of the reacting material in said reaction zone by injecting a temperature-stabilizing material which is substantially chemically inert toward said reactant in the non-gaseous state into said hot flame gases,
   b. vaporizing said temperature-stabilizing material therein prior to admixing the reactant therewith,
   c. admixing at least one reactant into said stream of mixed vaporized temperature-stabilizing material and flame gases of reduced temperature, and
   d. condensing said substance within said reaction zone, said substance having, at the partial pressure thereof prevailing in said reaction zone, a vaporizing temperature within the range of the reaction temperature.

2. The process as defined in claim 1 wherein said substance has a vaporizing temperature between 1000° and 2000° C. at the stated partial pressure thereof and is injected into said flame gases in amount sufficient to reduce the temperature thereof to within 300° C. of the vaporizing temperature of said substance.

3. The process as defined in claim 1 wherein said reactants are hydrocarbons and said reaction is the dehydrogenation of said hydrocarbons to produce unsaturated hydrocarbons having a higher carbon-to-hydrogen ratio.

4. The process as defined in claim 3 wherein said substance has a vaporizing temperature between 1000° and 2000° C. at the stated partial pressure thereof and is a halide of a member of class consisting of alkali metals and alkaline earth metals.

5. In the process for the pyrolysis of hydrocarbon reactants to produce unsaturated hydrocarbons of higher carbon-to-hydrogen ratio by feeding said reactants into a stream of hot flame gases produced by burning hydrogen-containing fuel with oxygen to raise the temperature of said reactants to pyrolysis temperature, and flowing the resultant mixture through a reaction zone wherein endothermic dehydrogenation of said hydrocarbon reactants occurs, that improvement which comprises injecting into said flame gases, while at a temperature above 2100° C., a liquid temperature-stabilizing substance and vaporizing the said liquid substance therein and thereby reducing the temperature of the flame gases to below 2000° C., prior to admixing said hydrocarbon reactants, and condensing said temperature-stabilizing substance in said reaction zone, said substance having, at the partial pressure thereof prevailing in said reaction zone, a vaporizing temperature between 1000° and 2000° C., being stable and substantially inert toward hydrocarbons occurring in said reaction zone, and being injected in amount sufficient to lower the temperature of said flame gases to below 2000° C.

6. Process as defined in claim 5 wherein said temperature-stabilizing substance has a vaporizing temperature between 1300° and 1850° C. at the stated partial pressure thereof and is injected in amount sufficient to lower the flame-gas temperature to a level whereat dissociation of water is less than 2%.

7. Process as defined in claim 6 wherein said temperature-stabilizing substance is injected in amount sufficient to lower the flame-gas temperature to a level whereat dissociation of water is less than 1%.

8. In the process for the pyrolysis of saturated hydrocarbons to produce unsaturated hydrocarbons by heating said saturated hydrocarbons to a temperature between about 300° and 750° C., feeding the heated hydrocarbons in the gaseous state into a stream of hot flame gases produced by burning hydrogen-containing fuel with oxygen to raise the temperature of said saturated hydrocarbons to pyrolysis temperature, flowing the resultant mixture through a reaction zone wherein endothermic dehydrogenation of said saturated hydrocarbons occurs, that improvement for increasing the yield of hydrocarbons having an atomic carbon-to-hydrogen ratio of unity which comprises injecting into said flame gases, while at a temperature above 2100° C., a liquid temperature-stabilizing substance and vaporizing said liquid substance therein, said liquid substance being injected in amount sufficient to reduce the temperature of the flame gases to a temperature at which the dissociation of water is less than 2%, and condensing said temperature-stabilizing substance in said reaction zone, said substance having, at the partial pressure thereof prevailing, a vaporizing temperature between 1300° and 1850° C. and being stable and substantially inert toward hydrocarbons occurring in said reaction zone.

9. Process according to claim 8 wherein said flame gases consist essentially of products produced by an oxy-hydrogen flame and have a temperature above 2500° C. prior to injection of said temperature-stabilizing liquid, the said liquid being preheated to above 1000° C. prior to injection and being injected in amount sufficient to reduce the temperature of said flame gases to below 1825° C.

10. Process according to claim 8 wherein the same temperature-stabilizing substance is injected as quench liquid.

References Cited in the file of this patent
UNITED STATES PATENTS

| | | |
|---|---|---|
| 2,396,679 | Gorin | Mar. 19, 1946 |
| 2,750,434 | Krejci | June 12, 1956 |
| 2,805,131 | McIntire | Sept. 3, 1957 |
| 2,823,243 | Robinson | Feb. 11, 1958 |
| 2,912,475 | Krause et al. | Nov. 10, 1959 |
| 3,010,794 | Friauf et al. | Nov. 28, 1961 |
| 3,010,795 | Friauf et al. | Nov. 28, 1961 |